No. 807,595. PATENTED DEC. 19, 1905.
W. H. BREWER.
HOSE COUPLING.
APPLICATION FILED OCT. 10, 1904.

Witnesses
R. A. Boswell
Q. L. Hough

Inventor
William H. Brewer
By Franklin N. Hough
Attorney

UNITED STATES PATENT OFFICE.

WILLIAM HARRISON BREWER, OF ROLLING PRAIRIE, INDIANA.

HOSE-COUPLING.

No. 807,595.     Specification of Letters Patent.     Patented Dec. 19, 1905.

Application filed October 10, 1904. Serial No. 227,953.

*To all whom it may concern:*

Be it known that I, WILLIAM HARRISON BREWER, a citizen of the United States, residing at Rolling Prairie, in the county of Laporte and State of Indiana, have invented certain new and useful Improvements in Hose-Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in hose-couplings; and it has for its object the provision of a simple and efficient device designed especially for use in the coupling of rubber hose, such as is commonly known as "garden-hose," although the device is equally well adapted for hose of other kinds.

The invention has also for its object the provision of a hose-coupling by the use of which two sections of hose may be quickly and securely attached.

To these ends and to such others as the invention may pertain the same consists in the peculiar construction and in the novel combination, arrangement, and adaptation of parts, all as will be more fully hereinafter described, shown in the accompanying drawings, and then specifically defined in the appended claim.

The invention is clearly illustrated in the accompanying drawings, which, with the letters of reference marked thereon, form a part of this specification.

Figure 1:
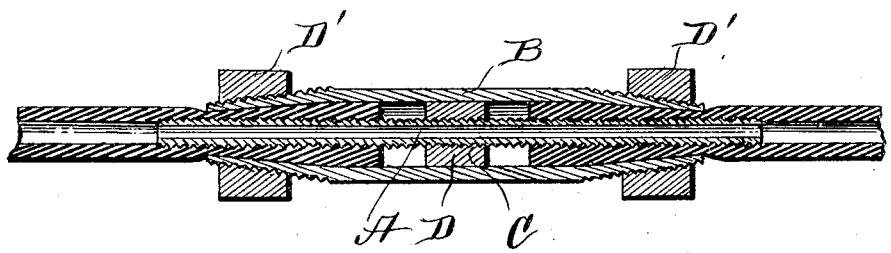
Figure 2:
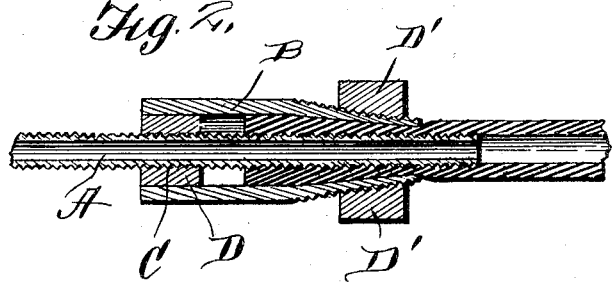
Figure 3:

In the drawings, Figure 1 is a longitudinal section through the coupling device having both ends beveled. Fig. 2 is like view of a modification of the device, showing one of its ends beveled; and Fig. 3 is a detail view of one of the beveled ends of the outer clamping member.

Reference now being had to the details of the drawings by letter, A designates a pipe or tube of metal having its outer surface screw-threaded, the diameter of this screw-threaded pipe or tube corresponding with the diameter of the hose with which it is to be used.

B is a clamping member provided with a bur or nut D, which is seated within the body portion of the clamp, the said nut or bur being provided with a screw-threaded aperture C for the reception of the screw-threaded tube or pipe A. At one or both of its ends the said clamping member B is tapered toward the end, the said screw-threaded portion being screw-threaded to receive the nut D', the interior of which is provided with a bevel corresponding to the bevel upon the clamp end, the threads of the said end being adapted to engage the threads upon the clamp. The body portion of the clamping member is provided with a series of longitudinal slots extending for a distance inward from the screw-threaded end of the clamp.

From the foregoing description of construction the operation of the device will be at once readily understood. The ends of the two hose-sections that are to be connected by means of the clamp are passed over the screw-threaded tube or pipe A, and the said tube is passed through the clamping member B, so that the hose will occupy the space between the screw-threaded member A and the interior walls of the clamping member B. It will at once be seen that by screwing up the nut D' the screw-threaded portion of the clamping member will be drawn inward and will thus serve to compress the hose between the outer screw-threaded surface of the tube or pipe A and the inner walls of the clamping member B, the degree of pressure depending upon the distance the clamp-nut D' is screwed upon the screw-threaded end of the said clamp. It will be at once evident that the clamping member may have one of its ends only beveled and screw-threaded or it may have both of its ends so beveled and screw-threaded in order to adapt the device for the particular use for which it is intended.

Having thus fully described my invention, what I claim to be new, and desire to secure by Letters Patent, is—

A hose-coupling comprising an open-ended tubular shell having a central cylindrical portion with parallel slits extending from said central portion to the tapering ends of said shell, an open-ended threaded tube passing centrally through said shell, a nut having a central threaded aperture to receive said tube, said nut bearing against the inner circumference of the solid portion of the shell, nuts having tapering walled apertures which are threaded and fitted upon the tapering ends of said shell, whereby the portions of said shell intermediate the slits may clamp a flexible pipe against the threads of said tube, as set forth.

In testimony whereof I hereunto affix my signature in presence of two witnesses.

WILLIAM HARRISON BREWER.

Witnesses:
WALTER W. WALT,
WALTER CONNER.